(12) United States Patent
Lorentzen

(10) Patent No.: US 9,223,371 B2
(45) Date of Patent: *Dec. 29, 2015

(54) ADAPTOR FOR ADDING A SECOND POWER SUPPLY UNIT TO A COMPUTER SYSTEM

(71) Applicant: David Lee Lorentzen, Collinsville, IL (US)

(72) Inventor: David Lee Lorentzen, Collinsville, IL (US)

(73) Assignee: David Lee Lorentzen, Collinsville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/531,412

(22) Filed: Nov. 3, 2014

(65) Prior Publication Data

US 2015/0052277 A1 Feb. 19, 2015

Related U.S. Application Data

(63) Continuation of application No. 13/092,874, filed on Apr. 22, 2011, now Pat. No. 8,878,390.

(51) Int. Cl.
*G06F 1/26* (2006.01)
*G06F 13/40* (2006.01)

(52) U.S. Cl.
CPC ............ *G06F 1/263* (2013.01); *G06F 13/4072* (2013.01); *Y10T 307/653* (2015.04); *Y10T 307/724* (2015.04); *Y10T 307/766* (2015.04); *Y10T 307/937* (2015.04)

(58) Field of Classification Search
CPC .............................. G06F 1/263; G06F 13/4072
USPC ........... 307/43, 64–66, 84, 86, 113, 115, 116, 307/125, 126
See application file for complete search history.

(56) References Cited

U.S. PATENT DOCUMENTS

| 4,101,886 A | | 7/1978 | Grimes et al. | |
|---|---|---|---|---|
| 5,721,481 A | * | 2/1998 | Narita et al. | 320/111 |
| 5,784,626 A | * | 7/1998 | Odaohara | 713/300 |
| 6,098,127 A | | 8/2000 | Kwang | |

(Continued)

OTHER PUBLICATIONS

Graham, "Tricks and Secrets for Successful CD Burning CDR Burning CDRW Burning, Burning Issues, CDR, CDRW, CD Burning Forum, Burningissues for Burning & Copying Copy Protected CD's, CD Burners, CD Writing, CD CDR CDWR Burning", Burning Issues, Oct. 2000, pp. 1-14.

(Continued)

*Primary Examiner* — Jared Fureman
*Assistant Examiner* — Carlos Laguerre
(74) *Attorney, Agent, or Firm* — Thompson Coburn LLP

(57) ABSTRACT

An adaptor for detachable connection with a first power supply unit (PSU) and a second PSU to augment the power delivered to a computer system is described. The adaptor may include a power connector configured for detachable connection with a complementary connector of the first PSU, a motherboard connector configured for detachable connection with a complementary connector of the second PSU, and a circuit between the power connector and the motherboard connector. The circuit may comprise a switch, and the circuit can be configured to, in response to an energization of the first PSU by the computer system, automatically close the switch and pass a signal through the closed switch and the motherboard connector for receipt by the second PSU for causing the second PSU to turn on to thereby augment the computer system with power from the second PSU.

20 Claims, 3 Drawing Sheets

(56) References Cited

U.S. PATENT DOCUMENTS

| | | |
|---|---|---|
| 6,274,949 B1 * | 8/2001 | Lioux et al. ............. 307/64 |
| 6,875,059 B2 * | 4/2005 | Sivertsen ............. 439/638 |
| 7,132,763 B2 | 11/2006 | Rendic |
| 7,311,525 B2 | 12/2007 | Koiwaya |
| 7,539,023 B2 | 5/2009 | Bulucea |
| 7,704,089 B2 | 4/2010 | Tseng |
| 7,722,406 B2 * | 5/2010 | Huang ............. 439/638 |
| 7,817,445 B2 | 10/2010 | Tan et al. |
| 7,825,539 B2 | 11/2010 | Ye et al. |
| 8,137,122 B2 | 3/2012 | Chen |
| 8,248,771 B2 | 8/2012 | Chang |
| 8,878,390 B2 | 11/2014 | Lorentzen |
| 2003/0067224 A1 * | 4/2003 | Tai ............. 307/117 |
| 2005/0266711 A1 * | 12/2005 | Petersen et al. ............. 439/225 |
| 2007/0019347 A1 * | 1/2007 | Tseng et al. ............. 361/90 |
| 2008/0228326 A1 | 9/2008 | Chen et al. |
| 2008/0246343 A1 * | 10/2008 | Xu ............. 307/126 |
| 2009/0127935 A1 * | 5/2009 | Hung et al. ............. 307/80 |
| 2009/0213533 A1 | 8/2009 | Bulucea |
| 2010/0017628 A1 | 1/2010 | Chen et al. |
| 2010/0064150 A1 | 3/2010 | Higuchi |
| 2010/0259955 A1 | 10/2010 | Shimada |
| 2011/0006735 A1 | 1/2011 | Wu et al. |
| 2011/0068625 A1 | 3/2011 | Duan et al. |
| 2011/0198924 A1 | 8/2011 | Yamaki et al. |
| 2011/0292706 A1 | 12/2011 | Wang |
| 2012/0124395 A1 | 5/2012 | Liang |

OTHER PUBLICATIONS

Prosecution History for U.S. Appl. No. 13/092,874, now U.S. Pat. No. 8,878,390, filed Apr. 22, 2011 (Lorentzen).

* cited by examiner

ADAPTOR FOR ADDING A SECOND POWER SUPPLY UNIT TO A COMPUTER SYSTEM

CROSS-REFERENCE AND PRIORITY CLAIM TO RELATED PATENT APPLICATION

This patent application is a continuation of U.S. patent application Ser. No. 13/092,874, filed Apr. 22, 2011, now U.S. Pat. No. 8,878,390, the entire disclosure of which is incorporated herein by reference.

DESCRIPTION OF RELATED ART

The present application relates to a computer power supply unit, and more particularly to an adaptor that allows a power supply unit be added to a computer as a plug-and-play device to provide extra power supply for the computer and its other plug-and-play devices.

Note that the points discussed below may reflect the hindsight gained from the disclosed inventions, and are not necessarily admitted to be prior art.

A power supply unit (PSU) of a computer is the component that supplies power to the other components by converting general-purpose alternating current electric power to computer usable low-voltage direct current (DC) for other components of the computer. The most common computer power supplies are built to conform with Advanced Technology eXtended (ATX) form factors. ATX power supplies usually are designed to turn on and off using a signal from the motherboard, and provide support for standby mode.

A conventional computer PSU is a square metal box having a large bundle of wires for connectors emerging from one end; on the other end is a connector for AC power. Many attempts have been made to add more than one PSU to a computer for added processing tasks and applications. But the control and management of the multiple PSUs remains to be a complicated task. For example, the US patent application US 2011/0068625 A1 introduces a dual electrical input line with an automatic transfer switch mechanism to manage multiple PSUs. US 2010/0064150 A1 discloses a design of baseboard management controllers for processing information and to control the plurality of PSUs.

Nevertheless the need to simply add a PSU to a pre-set computer for additional plug and play devices has not been addressed.

SUMMARY

The present application discloses a simple and novel plug-and-play adaptor (Add2Psu) that allows additional PSUs to be added in a plug-and-play manner.

For example, the present application discloses an apparatus for augmenting power delivered to a computer system, the apparatus comprising an adaptor for detachable connection with a first power supply unit (PSU) and a second PSU, the adaptor comprising: (1) a power connector configured for detachable connection with a complementary connector of the first PSU, (2) a motherboard connector configured for detachable connection with a complementary connector of the second PSU, and (3) a circuit between the power connector and the motherboard connector, the circuit comprising a switch, and wherein the circuit is configured to, in response to an energization of the first PSU by the computer system, automatically close the switch and pass a signal through the closed switch and the motherboard connector for receipt by the second PSU for causing the second PSU to turn on to thereby augment the computer system with power from the second PSU.

The present application also discloses an apparatus for augmenting power delivered to a computer system, the apparatus comprising an adaptor for detachable connection with a first power supply unit (PSU) and a second PSU, the adaptor comprising: (1) a 4-pin connector that conforms to a PSU power connector standard, the 4-pin connector configured for detachable connection with a complementary connector of the first PSU, (2) a 24-pin connector that conforms to an Advanced Technology eXtended (ATX) standard for a PSU, the 24-pin connector configured for detachable connection with a complementary connector of the second PSU, and (3) a circuit between the 4-pin connector and the 24-pin connector, the circuit comprising a switch, and wherein the circuit is configured to, in response to an energization of the first PSU by the computer system, automatically close the switch and pass a signal through the closed switch and the 24-pin connector for receipt by the second PSU for causing the second PSU to turn on to thereby augment the computer system with power from the second PSU.

The present application further discloses a method comprising: (1) connecting a first power supply unit (PSU) with an adaptor, the first PSU comprising (i) a first PSU motherboard connector connected to a computer system, and (ii) a first PSU power connector, the adaptor comprising (i) an adaptor power connector, and (ii) an adaptor motherboard connector, wherein the step of connecting the first PSU with the adaptor comprises connecting the first PSU power connector with the adaptor power connector, (2) connecting a second PSU with the adaptor, the second PSU comprising a second PSU motherboard connector, wherein the step of connecting the second PSU with the adaptor comprises connecting the second PSU motherboard connector with the adaptor motherboard connector, and (3) in response to the connecting steps, automatically (i) energizing the adaptor with power from the first PSU, (ii) closing a switch in the adaptor in response to the energizing of the adaptor, (iii) communicating a signal from the adaptor to the second PSU in response to the switch closing, and (iv) turning on the second PSU in response to the communicated signal, the turned on second PSU thus being available to provide additional power to the computer system.

In one embodiment, an example Add2Psu PSU adaptor includes at least one ATX connection and a DC relay.

In another embodiment, an example Add2Psu PSU adaptor comprises a printed circuit board disposed with a 4-pin connector, a 24-pin connector and a 12 VDC relay.

In another embodiment, an example Add2Psu PSU includes a relay, an ATX connector and a built-in PSU as a power source.

The disclosed innovation, in various embodiments, provides a simple mechanism to add a PSU in a plug-and-play manner. The adaptor can be treated as an independent unit that can be mounted or loosely placed anywhere inside a computer. A PSU can plug into the adaptor and be controlled by the signals from the motherboard and conform to the ATX form factors.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF SAMPLE EMBODIMENTS

Figure 1:
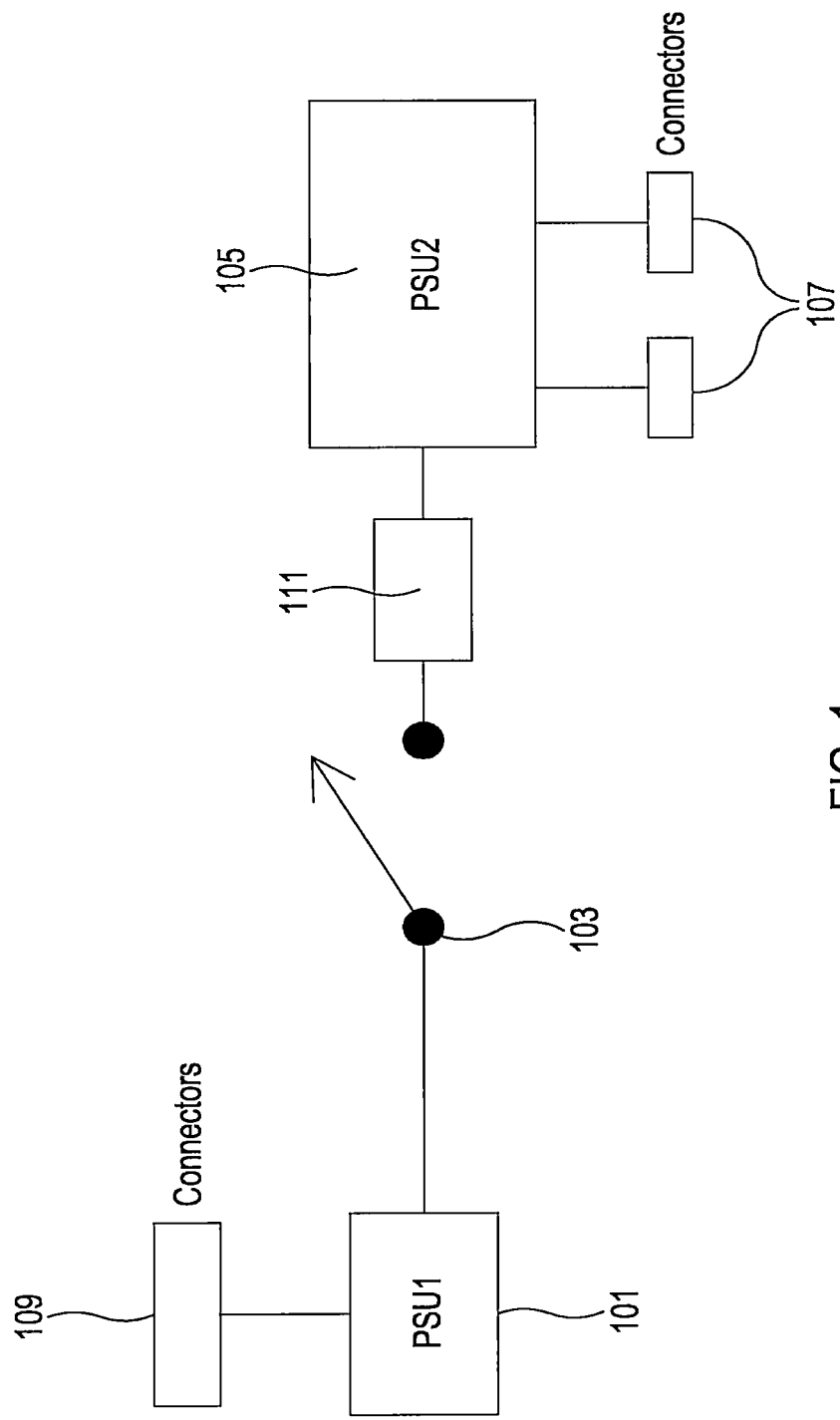
FIG. 1 is a schematic diagram of an example Add2Psu PSU adaptor operation mechanism in accordance with this application.

The numerous innovative teachings of the present application will be described with particular reference to presently preferred embodiments (by way of example, and not of limitation). The present application describes several embodiments, and none of the statements below should be taken as limiting the claims generally.

For simplicity and clarity of illustration, the drawing figures illustrate the general manner of construction, and description and details of well-known features and techniques may be omitted to avoid unnecessarily obscuring the invention. Additionally, elements in the drawing figures are not necessarily drawn to scale, some areas or elements may be expanded to help improve understanding of embodiments of the invention.

The terms "first," "second," "third," "fourth," and the like in the description and the claims, if any, may be used for distinguishing between similar elements and not necessarily for describing a particular sequential or chronological order. It is to be understood that the terms so used are interchangeable. Furthermore, the terms "comprise," "include," "have," and any variations thereof, are intended to cover non-exclusive inclusions, such that a process, method, article, apparatus, or composition that comprises a list of elements is not necessarily limited to those elements, but may include other elements not expressly listed or inherent to such process, method, article, apparatus, or composition.

It is contemplated and intended that the design apply to other PSU connection protocols, for example the AT standard, but for clarity reasons, the ATX (Advanced Technology eXtended) PSU standard is observed and used as an example.

A standard PSU includes a PC Main power connector that goes to the motherboard to provide it with power. The connector has 20 or 24 pins. One of the pins belongs to the PS-ON wire. A power supply with a 24-pin connector can be used on a motherboard with a 20-pin connector. In cases where the motherboard has a 24-pin connector, some power supplies come with two connectors, one with 20-pin and other with 4-pin) which can be used together to form the 24-pin connector.

A standard PSU also includes plurality of various 4-pin peripheral power connectors that go to the various disk drives, PCI cards, floppy drive or video cards of a computer.

A standard PSU may also include other auxiliary power connectors with various numbers of pins.

To conform to a standard PSU, an example Add2Psu generally comprises a 24-pin connector and/or a 4-pin connector so that a PSU may be plugged on to the adaptor via its 24-pin connector or one of its 4-pin connectors.

In reference to FIG. 1, PSU1 101 and PSU2 105 are connected with an Add2Psu adaptor 111 which includes a DC Relay 103. The 4-pin connector of Adaptor 111 plugs in with the 4-pin power connector of PSU1 101 and the ATX 24-pin connector of Adaptor 111 is connected with the 24-pin power connector of PSU2 105. The 24-pin power connector of PSU1 101 is connected with the motherboard of the computer.

When PSU1 101 is turned on by signal from the motherboard, the energy causes Relay 103 to close the circuit that sends signal through the ATX 24-pin of Adaptor 111 to PSU2 105 and turns on the PSU2 105. Therefore PSU2 works in the same manner as PSU1.

Figure 2:
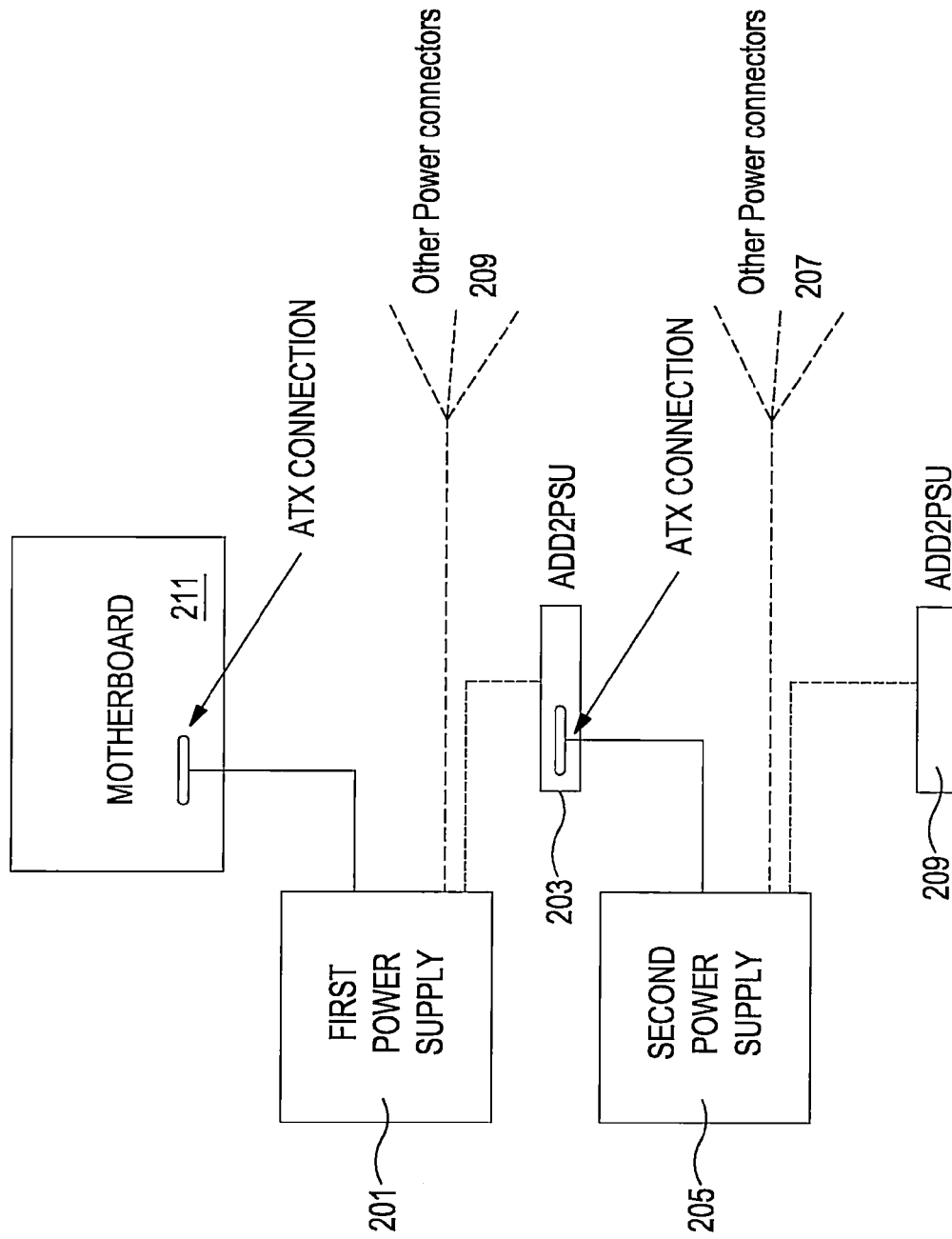
FIG. 2 is a schematic diagram of the plug-and-play mechanism of an example Add2Psu PSU adaptor in a computer system.

FIG. 2 illustrates the cascade scalability of an Add2Psu PSU adaptor. First PSU 201 and second PSU 205 are connected through Add2Psu adaptor 203 which provides an ATX connection to PSU 205. One of the 4-pin connectors of PSU 205 can be connected to another Add2Psu 209 which provides another ATX connection for another PSU, and the process can go on to add unlimited number of PSUs to the computer system. Signals from Motherboard 211 therefore controls all the PSUs in the same manner. More independent devices can be connected to the computer with their own power supply in a plug-and-play manner via the power connectors 207, 209 etc.

Figure 3:
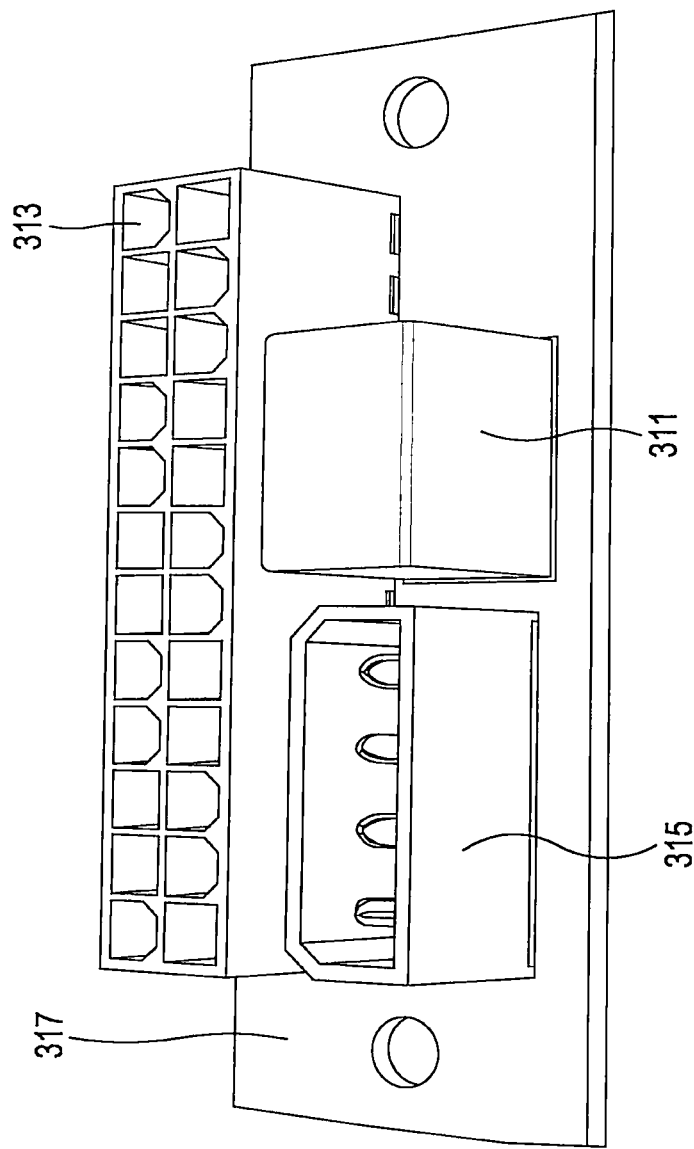
FIG. 3 is an example structure of an Add2Psu PSU adaptor.

In reference to FIG. 3, an example Add2Psu PSU adaptor includes an ATX 24-pin connector 313, a 4-pin connector 315, and a DC relay 311, which are disposed on a Printed Circuit Board 317 that conforms with the ATX standard of a PSU. Alternatively, the 4-pin connector may be omitted and the source of power for the adaptor may come from a slave power supply of the computer that is hosting the adaptor.

As will be recognized by those skilled in the art, the innovative concepts described in the present application can be modified and varied over a tremendous range of applications, and accordingly the scope of patented subject matter is not limited by any of the specific exemplary teachings given. It is intended to embrace all such alternatives, modifications and variations that fall within the spirit and broad scope of the appended claims.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is:

1. An apparatus for augmenting power delivered to a computer system, the apparatus comprising:
    an adaptor for detachable connection with a first power supply unit (PSU) and a second PSU, the adaptor comprising:
        a power connector configured for detachable connection with a complementary connector of the first PSU;
        a motherboard connector configured for detachable connection with a complementary connector of the second PSU; and
        a circuit between the power connector and the motherboard connector, the circuit comprising a switch, and wherein the circuit is configured to, in response to an energization of the first PSU by the computer system, automatically close the switch and pass a signal through the closed switch and the motherboard connector for receipt by the second PSU for causing the second PSU to turn on to thereby augment the computer system with power from the second PSU.

2. The apparatus of claim 1, wherein the adaptor's motherboard connector conforms to an Advanced Technology eXtended (ATX) standard for a PSU.

3. The apparatus of claim 2, wherein the adaptor's motherboard connector is a 24-pin connector conforming to the ATX standard.

4. The apparatus of claim 2, wherein the adaptor's power connector conforms to a PSU power connector standard.

5. The apparatus of claim 4, wherein the adaptor's power connector is a 4-pin power connector configured for detachable connection with a standardized peripheral connector of the first PSU.

6. The apparatus of claim 1, wherein the adaptor further comprises a printed circuit board, wherein the first connector, the second connector, and the circuit are disposed on the printed circuit board, and wherein the printed circuit board is configured to be mountable to a surface of the computer system.

7. The apparatus of claim 1, wherein the circuit comprises a relay circuit.

8. The apparatus of claim 7, wherein the relay circuit is a DC relay circuit.

9. The apparatus of claim 8, wherein the DC relay circuit is a 12 VDC relay circuit.

10. The apparatus of claim 7, wherein the adaptor's power connector is a standardized 4-pin connector, and wherein the adaptor's motherboard connector is a standardized 24-pin connector.

11. The apparatus of claim 10, wherein the standardized 24-pin connector conforms to an Advanced Technology eXtended (ATX) standard for a PSU.

12. The apparatus of claim 1, further comprising:
the first PSU, the first PSU comprising a motherboard connector and a power connector; and
the second PSU, the second PSU comprising a motherboard connector and a power connector;
wherein the first PSU is connected to the adaptor via a detachable connection between the first PSU's power connector and the adaptor's power connector; and
wherein the second PSU is connected to the adaptor via a detachable connection between the second PSU's motherboard connector and the adaptor's motherboard connector.

13. The apparatus of claim 12, further comprising:
the computer system;
wherein the first PSU is configured to connect with the computer system via the first PSU motherboard connector to provide the computer system with power;
wherein the computer system is configured to provide a signal to the first PSU to turn on and energize the first PSU.

14. The apparatus of claim 13, wherein the adaptor is a first adaptor, the system further comprising:
a third PSU, the third PSU comprising a motherboard connector and a power connector; and
a second adaptor, the second adaptor comprising a power connector, a motherboard connector, and a circuit, wherein the second adaptor's power connector is configured for detachable connection with a complementary power connector of the second PSU, wherein the second adaptor's motherboard connector is configured for detachable connection with a complementary motherboard connector of the third PSU, wherein the second adaptor's circuit is between the second adaptor's power connector and the second adaptor's motherboard connector, the second adaptor's circuit comprising a switch, and wherein the second adaptor's circuit is configured to, in response to an energization of the second PSU, automatically close the second adaptor's switch and pass a signal through the second adaptor's closed switch and the second adaptor's motherboard connector for receipt by the third PSU for causing the third PSU to turn on to thereby augment the computer system with power from the third PSU.

15. An apparatus for augmenting power delivered to a computer system, the apparatus comprising:
an adaptor for detachable connection with a first power supply unit (PSU) and a second PSU, the adaptor comprising:
a 4-pin connector that conforms to a PSU power connector standard, the 4-pin connector configured for detachable connection with a complementary connector of the first PSU;
a 24-pin connector that conforms to an Advanced Technology eXtended (ATX) standard for a PSU, the 24-pin connector configured for detachable connection with a complementary connector of the second PSU; and
a circuit between the 4-pin connector and the 24-pin connector, the circuit comprising a switch, and wherein the circuit is configured to, in response to an energization of the first PSU by the computer system, automatically close the switch and pass a signal through the closed switch and the 24-pin connector for receipt by the second PSU for causing the second PSU to turn on to thereby augment the computer system with power from the second PSU.

16. The apparatus of claim 15, wherein the adaptor further comprises a printed circuit board, wherein the 4-pin connector, the 24-pin connector, and the circuit are disposed on the printed circuit board.

17. The apparatus of claim 16, wherein the printed circuit board is configured to be mountable to a surface of the computer system.

18. The apparatus of claim 15, wherein the circuit comprises a relay circuit.

19. A method comprising:
connecting a first power supply unit (PSU) with an adaptor, the first PSU comprising (1) a first PSU motherboard connector connected to a computer system, and (2) a first PSU power connector, the adaptor comprising (1) an adaptor power connector, and (2) an adaptor motherboard connector, wherein the step of connecting the first PSU with the adaptor comprises connecting the first PSU power connector with the adaptor power connector;
connecting a second PSU with the adaptor, the second PSU comprising a second PSU motherboard connector, wherein the step of connecting the second PSU with the adaptor comprises connecting the second PSU motherboard connector with the adaptor motherboard connector;
in response to the connecting steps, automatically (1) energizing the adaptor with power from the first PSU, (2) closing a switch in the adaptor in response to the energizing of the adaptor, (3) communicating a signal from the adaptor to the second PSU in response to the switch closing, and (4) turning on the second PSU in response to the communicated signal, the turned on second PSU thus being available to provide additional power to the computer system.

20. The method of claim 19 wherein the adaptor power connector conforms to a power connector standard for a PSU, and wherein the adaptor motherboard connector conforms to an Advanced Technology eXtended (ATX) standard for a PSU.

* * * * *